(12) United States Patent  
Panchal et al.

(10) Patent No.: US 6,519,239 B1  
(45) Date of Patent: Feb. 11, 2003

(54) METHOD AND APPARATUS FOR PROVIDING DISPATCH SERVICE IN A CDMA COMMUNICATION SYSTEM

(75) Inventors: Rajendra A. Panchal, Algonquin, IL (US); Alex Rozenstrauch, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/443,538

(22) Filed: Nov. 19, 1999

(51) Int. Cl.[7] .................................................. H04J 3/00
(52) U.S. Cl. ........................................ 370/335; 455/519
(58) Field of Search .................. 370/335, 342, 370/312, 479, 475, 441; 375/205; 455/517, 519, 31.3

(56) References Cited

U.S. PATENT DOCUMENTS

| | | | |
|---|---|---|---|
| 4,723,264 A | * | 2/1988 | Sasuta et al. .................. 379/58 |
| 5,056,109 A | | 10/1991 | Gilhousen et al. |
| 5,216,692 A | | 6/1993 | Ling |
| 5,257,183 A | | 10/1993 | Tam |
| 5,265,119 A | | 11/1993 | Gilhousen |
| 5,323,452 A | | 6/1994 | Dickman et al. |
| 5,383,219 A | | 1/1995 | Wheatley, III et al. |
| 5,485,486 A | | 1/1996 | Gilhousen et al. |
| 5,548,808 A | | 8/1996 | Bruckert et al. |
| 5,590,177 A | | 12/1996 | Vilmur et al. |
| 5,613,209 A | | 3/1997 | Peterson et al. |
| 5,621,723 A | | 4/1997 | Walton, Jr. et al. |
| 5,691,979 A | | 11/1997 | Cadd et al. |
| 5,711,011 A | * | 1/1998 | Urs et al. .................... 455/520 |
| 5,797,097 A | | 8/1998 | Roach, Jr. et al. |
| 5,852,781 A | | 12/1998 | Ahvenainen |
| 5,878,038 A | | 3/1999 | Willey |
| 5,881,058 A | | 3/1999 | Chen |
| 5,881,368 A | | 3/1999 | Grob et al. |
| 5,887,252 A | * | 3/1999 | Noneman .................... 455/414 |
| 5,914,958 A | | 6/1999 | Chinitz et al. |
| 5,920,549 A | | 7/1999 | Bruckert et al. |
| 5,960,356 A | | 9/1999 | Alperovich et al. |
| 5,987,012 A | | 11/1999 | Bruckert et al. |
| 6,005,848 A | | 12/1999 | Grube et al. |
| 6,058,308 A | | 5/2000 | Kallin et al. |
| 6,115,388 A | | 9/2000 | Chinitz et al. |
| 6,169,906 B1 | | 1/2001 | Bruckert |
| 6,178,166 B1 | * | 1/2001 | Wilson et al. ............... 370/335 |
| 6,181,685 B1 | | 1/2001 | Chinitz et al. |
| 6,188,767 B1 | * | 2/2001 | Needham et al. ........... 380/271 |
| 6,233,461 B1 | | 5/2001 | Chinitz et al. |
| 6,333,921 B1 | | 12/2001 | Grube et al. |

FOREIGN PATENT DOCUMENTS

EP             0 828 355 A2      3/1998

* cited by examiner

Primary Examiner—Chau Nguyen  
Assistant Examiner—Alexander O. Boakye  
(74) Attorney, Agent, or Firm—Jeffrey K. Jacobs

(57) ABSTRACT

The present invention addresses the need for an apparatus and method for providing dispatch group and individual call services on a CDMA communication system. Generally, the present invention discloses modifications to the IS-95 CDMA standard such as substituting a dispatch identifier (e.g., 201) for the Electronic Serial Number (ESN) used to generate CDMA long-code masks (e.g., 211). In the present invention, transmitted voice information is encoded using a long-code mask thus derived. In addition, a dispatch identifier is used to determine (306 and 404) the appropriate paging resource for transmitting and receiving dispatch call pages.

19 Claims, 3 Drawing Sheets

METHOD AND APPARATUS FOR PROVIDING DISPATCH SERVICE IN A CDMA COMMUNICATION SYSTEM

CROSS-REFERENCE TO RELATED APPLICATION

This application is related to a co-pending application, "METHOD OF PROVIDING GROUP CALL SERVICES IN A CDMA COMMUNICATIONS SYSTEM", Ser. No. 09/069,586, filed on Apr. 29, 1998, assigned to the assignee of the present application, which prior application is hereby incorporated by reference verbatim, with the same effect as though the prior application were fully and completely set forth herein.

FIELD OF THE INVENTION

The present invention relates generally to communication systems and, in particular, to providing dispatch services in code division multiple access (CDMA) communication systems.

BACKGROUND OF THE INVENTION

Communication systems today, such as Motorola's "iDEN" system, provide users with both interconnect and dispatch services. Interconnect services include those services traditionally provided in cellular telephony, such as the ability to make a wireless telephone call. In contrast, dispatch services are those traditionally provided by two-way radio systems and include group call service and individual call service, for example.

The dispatch services allow a user to communicate in ways that are difficult or costly using today's cellular systems. The group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the individual call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the individual call service.

Although both dispatch and interconnect services are available to users of Motorola's "iDEN" system, they are not available on today's CDMA systems. Therefore, a need exists for an apparatus and method for providing group and individual call dispatch services on a CDMA communication system.

DESCRIPTION OF A PREFERRED EMBODIMENT

The present invention addresses the need for an apparatus and method for providing dispatch group and individual call services on a CDMA communication system. Generally, the present invention discloses modifications to the IS-95 CDMA standard such as substituting a dispatch identifier for the Electronic Serial Number (ESN) used to generate CDMA long-code masks. In the present invention, transmitted voice information is encoded using a long-code mask thus derived. In addition, a dispatch identifier is used to determine the appropriate paging resource for transmitting and receiving dispatch call pages.

The present invention encompasses a method for a base site to provide a dispatch service to numerous communication units in a CDMA communication system. The base site receives from a communication unit a dispatch call request and determines a paging resource using a dispatch identifier. The dispatch identifier identifies a dispatch group of which the communication unit is a member. The base site transmits a dispatch page via the paging resource and receives voice information from the communication unit that is encoded using a CDMA long-code mask derived from the dispatch identifier.

Additionally, the present invention encompasses a method for a communication unit to obtain dispatch service from a base site in a CDMA communication system. The communication unit determines a paging resource using a first dispatch identifier that identifies a dispatch group of which the communication unit is a member. The communication unit then receives from the base site a dispatch page via the paging resource and voice information encoded using a CDMA long-code mask derived from a second dispatch identifier. The second dispatch identifier identifies a dispatch group of which an originating communication unit is a member.

Further, the present invention encompasses communication system network equipment. The network equipment comprises a base site capable of receiving a dispatch call request from a communication unit and determining a paging resource using a dispatch identifier. This dispatch identifier identifies a dispatch group of which the communication unit is a member. The network equipment is further capable of transmitting a dispatch page via the paging resource and receiving voice information from the communication unit that is encoded using a CDMA long-code mask derived from the dispatch identifier.

The present invention also encompasses a communication unit apparatus capable of determining a paging resource using a dispatch identifier. This dispatch identifier identifies a dispatch group of which the communication unit is a member. The communication unit apparatus is further capable of receiving a dispatch page via the paging resource and receiving voice information that is encoded using a CDMA long-code mask derived from the dispatch identifier.

Figure 1:
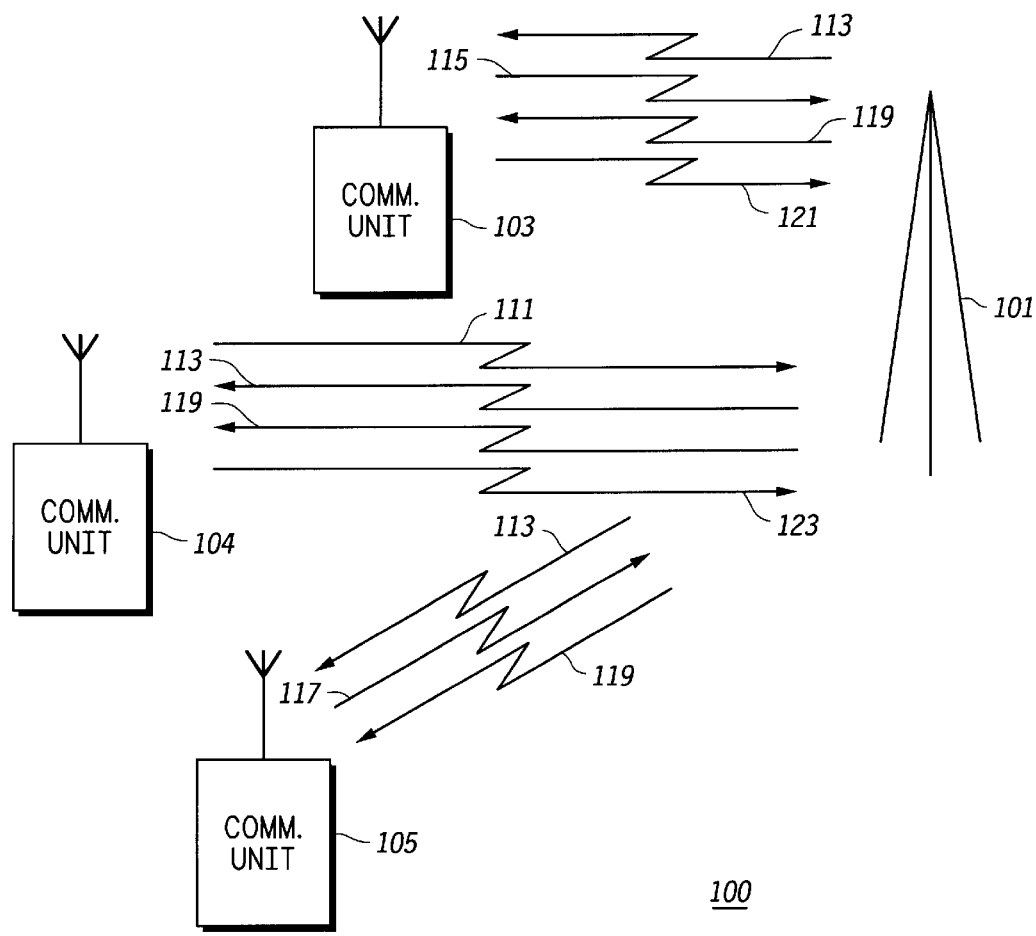
FIG. 1 is a block diagram depiction of a CDMA communication system in accordance with a preferred embodiment of the present invention.

The present invention can be more fully understood with reference to FIGS. 1–4. FIG. 1 is a block diagram depiction of a CDMA communication system 100 in accordance with a preferred embodiment of the present invention. Preferably, the CDMA communication system 100 is a system in accordance with the Telecommunications Industry Association/Electronic Industries Association Standard 95 (TIA/EIA IS-95-B), as known in the art, except for the modifications necessary to implement the present invention.

CDMA communication system 100 comprises fixed network equipment and mobile communication units. The fixed network equipment includes a base site 101 that is preferably networked to other base sites, controllers, and switches, all part of the fixed network equipment of system 100 and all well known to those skilled in the art. For simplicity, only base site 101 of the fixed network equipment is shown in FIG. 1. Again for simplicity, only three of what could be thousands of mobile communication units are shown in FIG. 1. Communication units 103–105 each preferably comprise CDMA-capable wireless phones. They communicate with base site 101 via a CDMA air interface that comprises coded-channel communication resources 111–123. In an alternative embodiment, however, the communication units could comprise any communication device capable of communicating via a CDMA air interface.

Operation of the preferred CDMA communication system 100, in accordance with the present invention, occurs substantially as follows. Communication units 103–105 are, for the purpose of illustration, logically arranged into a dispatch group. Therefore, the user of communication unit 104, can either make a dispatch group call involving the other group members 103 and 105 or a dispatch individual call to either communication unit 103 or communication unit 105 (or any other dispatchcapable communication unit in system 100). To make a dispatch call, the user of communication unit 104 preferable depresses its PTT button. This causes communication unit 104 to transmit a dispatch call request to base site 101 via inbound, coded channel 111. Preferably, the dispatch call request is a modified IS-95 "ORIGINATION MESSAGE" wherein the "MSID" field is set to the individual-specific dispatch identifier of the requesting unit, communication unit 104, the "SPECIAL_SERVICE" flag is set, and the "SERVICE_OPTION" field is set to indicate that this is a dispatch group call or a dispatch individual call. Further, the "NUMBER_FIELDS" field is set to the dispatch identifier of the target. If this is a dispatch individual call, the field would contain the individual-specific dispatch identifier of the target device. Otherwise, if this is a dispatch group call, the field would contain the group-specific dispatch identifier of the target dispatch group.

Figure 2:
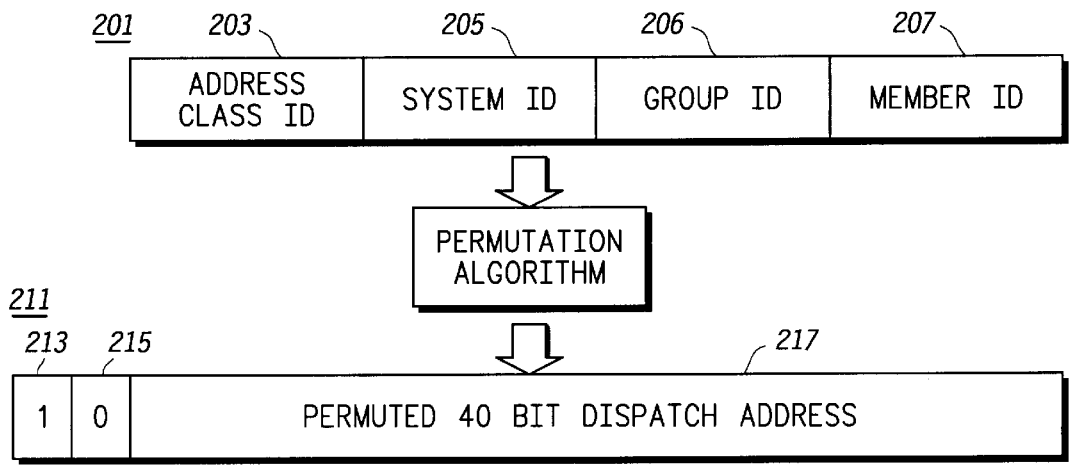
FIG. 2 is a block diagram depiction of a dispatch identifier and a CDMA long-code mask derived from the dispatch identifier in accordance with a preferred embodiment of the present invention.

The dispatch identifier concept can be more clearly understood by referring to FIG. 2. Block 201 is a block diagram depiction of a preferred, individual-specific dispatch identifier. Generally, the preferred dispatch identifier 201 employs multi-layer-addressing techniques for increased addressing flexibility. Thus, the ID-type portion 203 of dispatch identifier 201 indicates the format or type of the ID portion that follows (i.e., blocks 205–207).

As shown in FIG. 2, the ID-type portion 203 indicates that the ID portion consists of a system-ID portion 205, a group-ID portion 206, and a member-ID portion 207. Here the system-ID portion 205 would distinguish among multiple communication systems, the group-ID portion 206 among multiple dispatch groups within the system, and the member-ID portion 207 among multiple dispatch group members within the dispatch group. Since the member-ID portion 207 identifies the individual from the other members of the dispatch group, the presence of the member-ID portion 207 makes the dispatch identifier 201 an individual-specific dispatch identifier. A group-specific dispatch identifier, on the other hand, is preferably of the same format as a corresponding individual-specific dispatch identifier except that a default value placed in the member-ID portion of the identifier (NULL, for example). An alternative ID-type portion could indicate that the ID portion consists of only a group-ID portion and a member-ID portion. Such an addressing scheme might be more appropriate for a system that has to support a large number of groups and a large number of members within the groups, for example.

With regard again to FIG. 1, base site 101 receives the dispatch call request from communication unit 104, and determines a paging resource 113 using the dispatch identifier of the target from the call request. Preferably, the paging resource 113 comprises a paging channel and a paging slot that are derived by applying the IS-95 hashing algorithm to the dispatch identifier in the same manner the algorithm is applied to the International Mobile Station Identity (IMSI) under the IS-95 standard. The base site 101 then transmits a dispatch page via the derived paging resource 113. The dispatch page is preferably a modified, IS-95 "GENERAL PAGE MESSAGE" wherein the "SPECIAL SERVICE" field is set and the "SERVICE OPTION" field indicates that it is a dispatch page.

Likewise, the communication units 103–105 use their corresponding individual-specific dispatch identifiers and group-specific dispatch identifiers to determine the paging resources to monitor. Assuming this is a dispatch group call, communication units 103–105 would thereby receive the dispatch page via paging resource 113. Were it a dispatch individual call instead, only the target communication unit would receive the dispatch page. For the group call case both communication units 103 and 105, then transmit, via communication resources 115 and 117, respectively, in accordance with IS-95, a page response message that includes the dispatch identifier. The page response message is preferably a modified, IS-95 "PAGE RESPONSE MESSAGE" wherein the "MSID" is set to the unit's individual-specific dispatch identifier, the "SPECIAL_SERVICE" flag is set, and the "SERVICE_OPTION" field indicates that the response is to a dispatch page.

Base site 101 then preferably transmits, via paging resource 113, a traffic channel assignment that comprises the dispatch identifier. The traffic channel assignment is preferably a modified, IS-95 "CHANNEL ASSIGNMENT MESSAGE" wherein "ADDR_TYPE", "ADDR_LEN", and "ADDRESS" fields are used to convey the dispatch identifier of either the group-specific dispatch identifier for a dispatch group call or the individual-specific dispatch identifier of the call originator (communication unit 104 in the present example) for a dispatch individual call.

Upon receiving the traffic channel assignment, the target communication unit(s) preferably derive a CDMA long-code mask from the dispatch identifier in the traffic channel assignment. As shown in FIG. 2, deriving a long-code mask 211 from the dispatch identifier 201 preferably involves applying an IS-95 permutation algorithm to the dispatch identifier 201. The result is the permuted 40-bit dispatch address 217 of the long-code mask 211. Thus, the CDMA long-code mask 211 is derived from the dispatch identifier 201, in conformance with the IS-95 CDMA specification.

The present invention differs from the IS-95 specification, however, by permuting a dispatch identifier rather than the communication unit's Electronic Serial Number (ESN). The present invention also differs from the IS-95 specification in that a portion of the CDMA long-code mask indicates that the CDMA long-code mask is derived from a dispatch identifier. Specifically, the two most-significant bits of the mask 211, represented by blocks 213 and 215, are preferably set to "1" and "0", respectively, to indicate that the long-code mask was derived from a dispatch identifier instead of an ESN.

Base site 101 now preferably transmits an order message, via communication resource 119 (i.e., assigned forward traffic channel), that is encoded using the CDMA long-code mask derived from the dispatch identifier. The order message is preferably a modified IS-95 "ORDER MESSAGE" wherein the "ORDER" field indicates that this is a dispatch call control order and the "TRANSMITTER" field contains the individualspecific dispatch identifier of the call originator (i.e., communication unit 104 in the present example).

All communication units participating in the dispatch call (communication units 103–105, in the group call case) receive this order message and decode it using the long-code mask derived from the appropriate dispatch identifier. This first order message gives transmit prerogative to communication unit 104, the call originator. Communication unit 104 then converts the user's speech into voice information and transmits the voice information via communication resource 123 (i.e., the reverse traffic channel of communication unit 104). The voice information is encoded using the CDMA long-code mask derived from either the group-specific dispatch identifier, for a group dispatch call, or the individual-specific dispatch identifier, for an individual dispatch call.

Base site 101 receives the voice information from communication unit 104 and then transmits, via communication resource 119, the voice information. The voice information is again encoded using the CDMA long-code mask derived from the appropriate dispatch identifier. Thus, all the communication units in the call except the transmitting unit (i.e., communication units 103 and 105, in the group call case) receive the encoded voice information and decode it using the CDMA long-code mask derived from the appropriate dispatch identifier.

After communication unit 104 finishes transmitting voice information, communication unit 103, for example, may transmit next. Communication unit 103, however, would first need to receive an order message from base site 101 granting it transmit prerogative. Upon receiving such an order message, communication unit 103 would transmit voice information via communication resource 121 encoded just as communication unit 104 encoded its transmissions. In preferred dispatch communication, only one communication unit will be transmitting voice information at once. Therefore, base site 101 facilitates, using order messages, who among the individuals or group members involved in the call can transmit.

Figure 3:
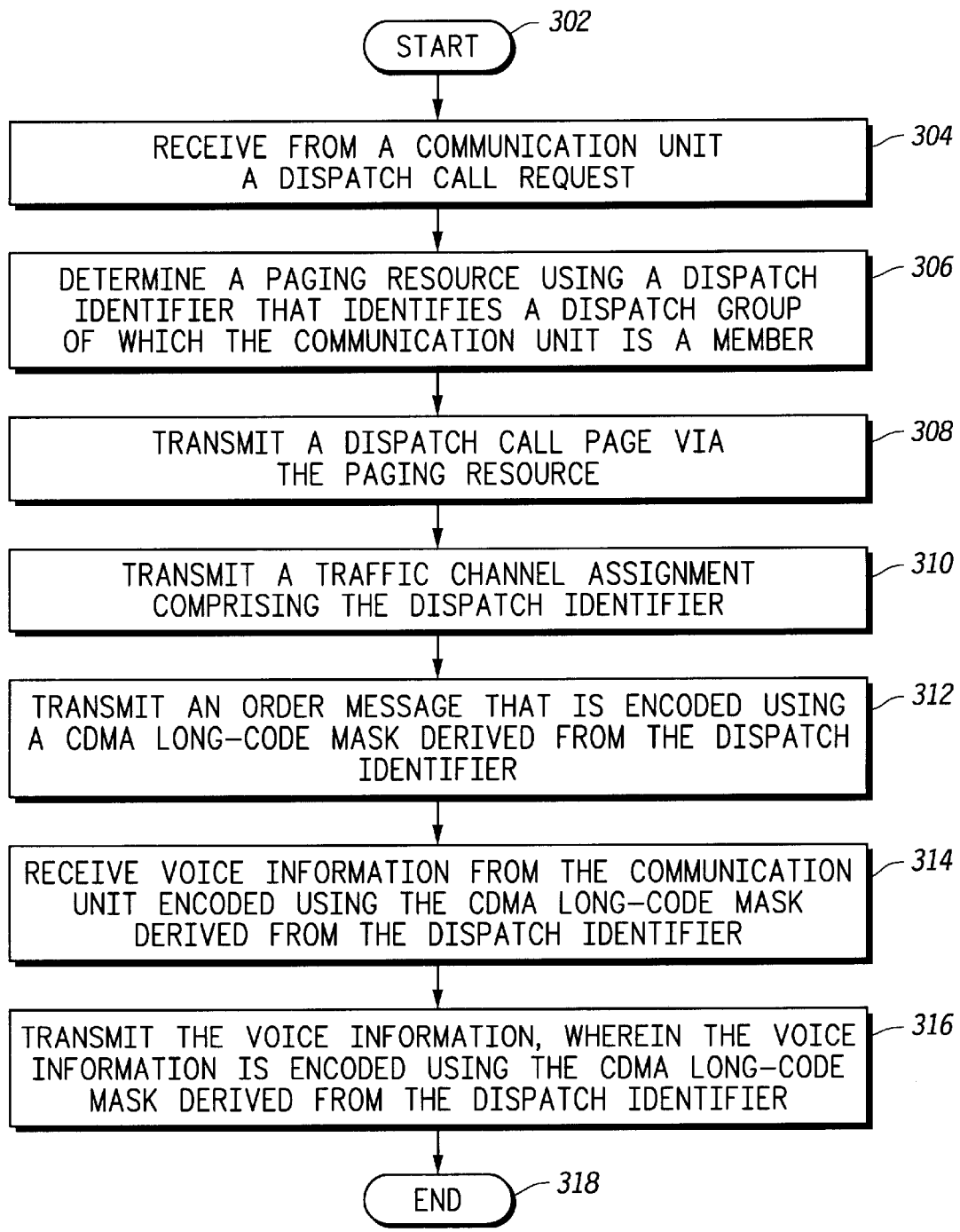
FIG. 3 is a logic flow diagram of steps executed by a base site, to provide dispatch service to a plurality of communication units in a CDMA communication system, in accordance with a preferred embodiment of the present invention.

FIG. 3 is a logic flow diagram 300 of steps executed by a base site, to provide dispatch service to numerous communication units in a CDMA communication system. The logic flow begins (302) when the base site receives (304) a dispatch call request from a communication unit. In the preferred embodiment, this dispatch request may be either a dispatch group call request or a dispatch individual call request. The base site determines (306) a paging resource using a dispatch identifier that identifies a dispatch group of which the communication unit is a member. If a dispatch group call request was received, then the dispatch identifier used is the group-specific dispatch identifier. Otherwise, if a dispatch individual call request was received, then the dispatch identifier used is the individual-specific dispatch identifier.

In the preferred embodiment, the base site then transmits (308) a dispatch page via the paging resource, and (310) a traffic channel assignment comprising the dispatch identifier. The base site further transmits (312) an order message that is encoded using a CDMA long-code mask derived from the dispatch identifier. The dispatch identifier, again, is either the group-specific dispatch identifier or the individual-specific dispatch identifier depending on whether the call is a group or individual dispatch call, respectively.

The base site then receives (314) voice information from the communication unit that is encoded using a CDMA long-code mask derived from the dispatch identifier. Finally, the base site transmits (316) the voice information received, preferably encoding it using the same long-code mask, and the logic flow ends (318).

Figure 4:
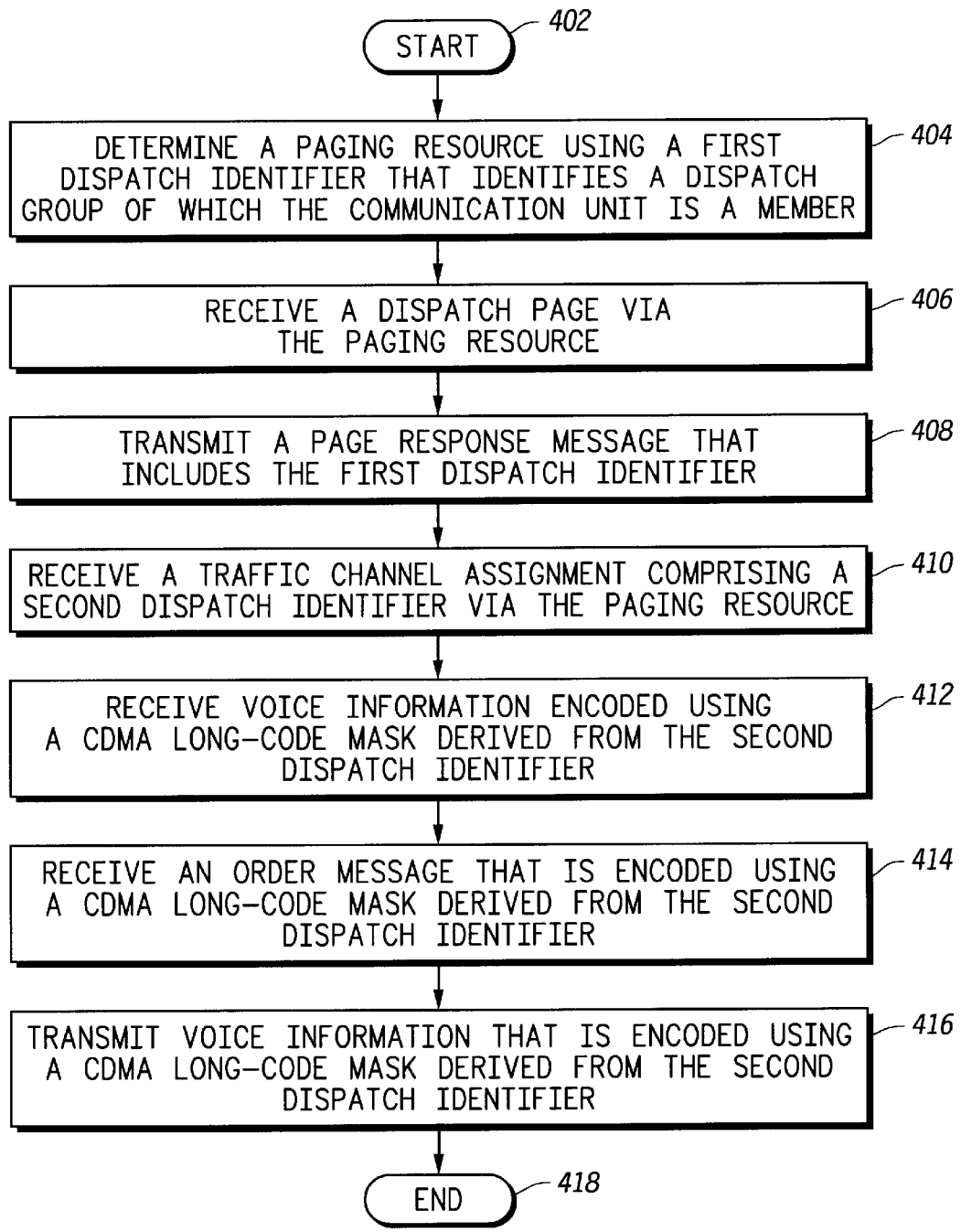
FIG. 4 is a logic flow diagram of steps executed by a communication unit, to obtain dispatch service from a base site in a CDMA communication system, in accordance with a preferred embodiment of the present invention.

FIG. 4 is a logic flow diagram 400 of steps executed by a communication unit, to obtain dispatch service from a base site in a CDMA communication system. The logic flow begins (402) when the communication unit determines (404) a paging resource using a first dispatch identifier that identifies a dispatch group of which the communication unit is a member. The communication unit receives (406) from the base site, a dispatch page via the paging resource. In response, the communication unit transmits (408) a page response message that includes the first dispatch identifier.

Also via the paging resource, the communication unit receives (410) a traffic channel assignment comprising a second dispatch identifier. This second dispatch identifier identifies a dispatch group of which the originating communication unit is a member. The communication unit then receives (412) from the base site voice information encoded using a CDMA long-code mask that is derived from the second dispatch identifier. When the communication unit has been paged to join a dispatch individual call, rather than a dispatch group call, the first dispatch identifier further identifies the communication unit from other communication units of the communication unit's group. That is, the first dispatch identifier is an individual-specific dispatch identifier. In addition, when joining a dispatch individual call rather than a dispatch group call, the second dispatch identifier further identifies the originating communication unit from other communication units of the originating communication unit's group. That is, the second dispatch identifier is also an individual-specific dispatch identifier.

The communication unit further receives (414) from the base site an order message that is encoded using a CDMA long-code mask derived from the second dispatch identifier. Preferably, if the order message has granted the communication unit a turn to transmit, then the communication unit transmits (416) voice information that is encoded using a CDMA long-code mask that is derived from the second dispatch identifier, and the logic flow ends (418).

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a base site to provide a dispatch service to a plurality of communication units in a CDMA communication system, the method comprising the steps of:

receiving, by the base site from a communication unit of the plurality of communication units, a dispatch call request;

determining, by the base site, a paging resource using a dispatch identifier that identifies a dispatch group of which the communication unit is a member, wherein the dispatch identifier comprises an ID portion and an ID-type portion and wherein the ID-type portion identifies the type of ID contained in the ID portion;

transmitting, by the base site, a dispatch page via the paging resource; and receiving, by the base site, voice information from the communication unit encoded using a CDMA long-code mask derived from the dispatch identifier.

2. The method of claim 1, further comprising the steps of:

transmitting, by the base site, a traffic channel assignment comprising the dispatch identifier;

transmitting, by the base site, an order message, wherein the order message is encoded using the CDMA long-code mask derived from the dispatch identifier; and transmitting, by the base site, the voice information, wherein the voice information is encoded using a CDMA long-code mask derived from the dispatch identifier.

3. The method of claim 2, wherein the dispatch call request comprises a dispatch group call request and wherein the voice information and the order message is encoded using a CDMA long-code mask derived from a group-specific dispatch identifier that corresponds to the dispatch identifier.

4. The method of claim 2, wherein the dispatch call request comprises a dispatch individual call request and wherein the voice information and the order message is encoded using a CDMA long-code mask derived from a individual-specific dispatch identifier that corresponds to the dispatch identifier.

5. The method of claim 1, wherein the paging resource comprises a paging channel and a paging slot.

6. The method of claim 1, wherein the voice information is encoded, using the CDMA long-code mask derived from the dispatch identifier, in conformance with an IS-95 CDMA specification.

7. The method of claim 1, wherein a portion of the CDMA long-code mask indicates that the CDMA long-code mask is derived from a dispatch identifier.

8. The method of claim 1, wherein the dispatch identifier further identifies the communication unit from other communication units of the dispatch group.

9. The method of claim 1, wherein the ID portion of the dispatch identifier comprises a group-ID portion and a member-ID portion.

10. The method of claim 9, wherein the group-ID portion of the dispatch identifier further comprises a system-ID portion.

11. A method for a communication unit to obtain dispatch service from a base site in a CDMA communication system, the method comprising the steps of:

determining, by the communication unit, a paging resource using a first dispatch identifier that identifies a dispatch group of which the communication unit is a member;

receiving, by the communication unit from the base site, a dispatch page via the paging resource; and receiving, by the communication unit from the base site, voice information encoded using a CDMA long-code mask derived from a second dispatch identifier that identifies a dispatch group of which an originating communication unit is a member, wherein the second dispatch identifier comprises an ID portion and an ID-type portion and wherein the ID-type portion identifies the type of ID contained in the ID portion.

12. The method of claim 11 further comprising the steps of:

receiving, by the communication unit via the paging resource, a traffic channel assignment comprising the second dispatch identifier;

transmitting, by the communication unit, a page response message that includes the first dispatch identifier;

receiving, by the communication unit from the base site, an order message, wherein the order message is encoded using a CDMA long-code mask derived from the second dispatch identifier; and transmitting, by the communication unit, voice information that is encoded using a CDMA long-code mask derived from the second dispatch identifier.

13. The method of claim 12, wherein the first dispatch identifier further identifies the communication unit from other communication units of the communication unit's dispatch group and wherein the second dispatch identifier further identifies the originating communication unit from other communication units of the originating communication unit's dispatch group.

14. Communication system network equipment comprising:

a base site that comprises a processor coupled to a receiver and a transmitter, wherein the receiver is arranged to receive a dispatch call request from a communication unit, the processor is arranged to determine a paging resource using a dispatch identifier that identifies a dispatch group of which the communication unit is a member, the transmitter is arranged to transmit a dispatch page via the paging resource, the receiver is further arranged to receive voice information from the communication unit encoded using a CDMA long-code mask derived from the dispatch identifier, wherein the dispatch identifier comprises an ID portion and an ID-type portion and wherein the ID-type portion identifies the type of ID contained in the ID portion.

15. The communication system network equipment of claim 14, wherein the transmitter is further arranged to transmit a traffic channel assignment comprising the dispatch identifier, an order message that is encoded using the CDMA long-code mask derived from the dispatch identifier, and voice information that is encoded using the CDMA long-code mask derived from the dispatch identifier.

16. The communication system network equipment of claim 15, wherein the dispatch identifier further identifies the communication unit from other communication units of the dispatch group.

17. A communication unit apparatus comprising:

a wireless communication unit that comprises a processor coupled to a receiver, wherein the processor is arranged to determine a paging resource using a first dispatch identifier that identifies a dispatch group of which the communication unit apparatus is a member and the receiver is arranged to receive a dispatch page via the paging resource and to receive voice information encoded using a CDMA long-code mask derived from a second dispatch identifier that identifies a dispatch group of which an originating communication unit is a member, wherein the second dispatch identifier comprises an ID portion and an ID-type portion and wherein the ID-type portion identifies the type of ID contained in the ID portion.

18. The communication unit apparatus of claim 17, wherein the wireless communication unit further comprises a transmitter, the transmitter is further arranged to transmit a page response message that includes the first dispatch identifier, the receiver is further arranged to receive via the paging resource a traffic channel assignment comprising the second dispatch identifier and to receive an order message that is encoded using a CDMA long-code mask derived from the second dispatch identifier, and the transmitter is further arranged to transmit voice information that is encoded using a COMA long-code mask derived from the second dispatch identifier.

19. The communication unit apparatus of claim 18, wherein the first dispatch identifier further identifies the communication unit apparatus from other communication units of the dispatch group and wherein the second dispatch identifier identifies an originating communication unit.

* * * * *

UNITED STATES PATENT AND TRADEMARK OFFICE
CERTIFICATE OF CORRECTION

PATENT NO. : 6,519,239 B1
DATED : February 1, 2003
INVENTOR(S) : Panchal et al.

It is certified that error appears in the above-identified patent and that said Letters Patent is hereby corrected as shown below:

Column 8,
Line 57, reads "COMA", should be -- CDMA --.

Signed and Sealed this

Twenty-fifth Day of March, 2003

JAMES E. ROGAN
*Director of the United States Patent and Trademark Office*